Figure 1:
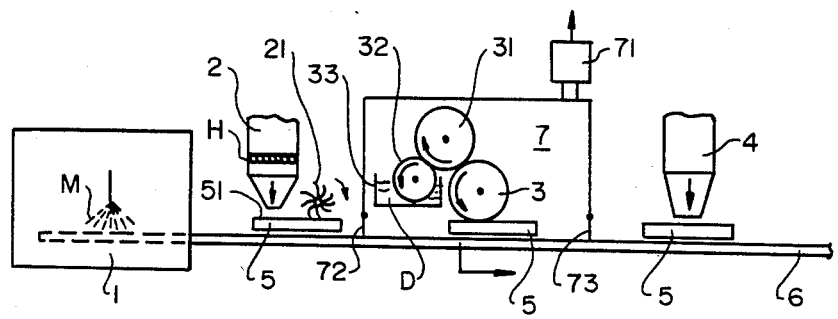

United States Patent [19]

Stiegler

[11] Patent Number: 4,620,989
[45] Date of Patent: Nov. 4, 1986

[54] METHOD AND DEVICE FOR IMPREGNATING ESPECIALLY NATURAL STONES

[75] Inventor: Ludwig Stiegler, Solnhofen, Fed. Rep. of Germany

[73] Assignee: Johann Stiegler KG, GMBH & Co., Solnhofen, Fed. Rep. of Germany

[21] Appl. No.: 650,327

[22] Filed: Sep. 12, 1984

[30] Foreign Application Priority Data

Sep. 15, 1983 [DE] Fed. Rep. of Germany ....... 3333276

[51] Int. Cl.$^4$ .......................... B05D 3/02; B05D 3/12; C23C 14/00
[52] U.S. Cl. ..................................... 427/289; 118/50; 118/239; 118/244; 118/262; 427/294; 427/379; 427/393.6; 428/540
[58] Field of Search ............... 427/294, 379, 350, 428, 427/393.6, 289; 118/50, 239, 244, 262; 428/540

[56] References Cited

U.S. PATENT DOCUMENTS

| | | | |
|---|---|---|---|
| 3,563,786 | 2/1971 | Tse et al. | 427/294 |
| 3,795,533 | 3/1974 | Gauri | 428/540 X |
| 4,233,929 | 11/1980 | Hurst et al. | 118/50 |
| 4,503,801 | 3/1985 | Collishaw et al. | 118/262 X |

Primary Examiner—Michael R. Lusignan
Attorney, Agent, or Firm—Sprung Horn Kramer & Woods

[57] ABSTRACT

Method and device for impregnating plates (5) with a dispersion (D), whereby the plates (5) are saturated with dispersant (M) in a device (1) and the plates (5) are dried with dry air in a drying system (2) from the surfaces (51) to be impregnated down to a predetermined depth and then the dispersion (D) is introduced with an application device (3) into the dried area and the plates (5) subsequently dried.

The application roller (3) is located in a vacuum chamber (7). The plates (5) are conveyed among the various devices (1, 2, 3, 4) with a continuous conveyor (6), a conveyor belt for example.

11 Claims, 3 Drawing Figures

METHOD AND DEVICE FOR IMPREGNATING ESPECIALLY NATURAL STONES

Impregnating absorbent materials, especially natural stones with dispersed materials, especially cross-linked plastics, is known. The dispersion is applied to the surface, dried and extensively freed of dust and detritus, of the stone, subsequent to which the dispersion penetrates into the capillaries, so that the dispersed material becomes embedded in the capillaries and hardens there as soon as the dispersant becomes distributed or evaporates.

The known method is employed for both the tops and bottoms of paving stones intended for application as wall or floor coverings, with the latter in particular needing to be protected from the uptake of moisture from the ground and mortar. It has in fact been demonstrated that moisture from the ground and/or mortar releases constituents that are transported through the paving stones as far as their surface, where they are enriched by the constant evaporation of the solvent water and discolor the stone themselves or as the result of chemical transformation of the minerals in the stone. This process is a special drawback in that it continues uninterrupted for years. Natural stones are as a countermeasure impregnated from the "bottom," where, that is, they come into contact with the mortar or adhesive, with a waterproof emulsion. Dispersions based on acrylic resin and with a mean particle or droplet size smaller than the mean width of the pores in the stone are employed for example for this purpose.

The drawback of the known method is that relatively large amounts of dipersion must be applied to obtain an impregnation or insulation that leads to satisfactory sealing. Otherwise, the impregnation will not form a reliable seal.

The object of the invention is to disclose a method that allows an impregnation leading to reliable sealing at relatively low consumption of the dispersion in a simple way.

This object is attained in that the capillaries are saturated with dispersant (water), the surface to be sealed then dried subject to control down to a slight depth, and then the surface saturated with the dispersion.

The method causes only a slight amount of dispersion to be accepted by the dried area, which remains saturated until the dispersed material sets. No indefinitely small concentration can occur in such a shallow area because the deeper area is already saturated with dispersant.

The method can also be integrated to great advantage into the cutting, grinding, and drying of paving stones. Since cutting and grinding or trimming is accompanied by the addition of water, the stone will already be subsequently saturated with water. Thus, regulated drying, dust removal, and saturation with dispersion will follow that stage of the method.

It is practical for the dispersion to be applied with sponge rollers or brushes to ensure that, given adequate dwell time, the amount of dispersion necessary for saturation will always be absorbed, ensuring a satisfactory seal. The amount will automatically adjust to need in accordance with the particular level of dryness and porosity of the surface.

Another advantage of sealing directly subsequent to cutting is the elimination of one manual operation and subsequent drying prior to laying the stones. If this drying, which must be carried out prior to laying, is not completed, which can easily occur, either the mortar or adhesive will not adhere properly subject to certain conditions or the dispersion will migrate into the mortar and deteriorate the seal.

The method and one device for carrying it out in the case of coating one side will now be described by way of example with reference to the figures. The method can be varied for coating all surfaces of the stone and for coating stones that are already in place.

Figure 3:
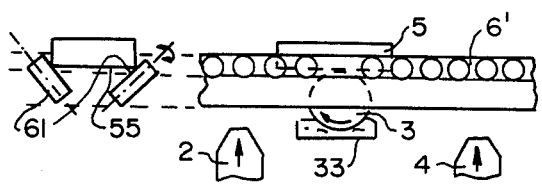

FIGS. 1 and 3 illustrate a continuous impregnation layout and

Figure 2:
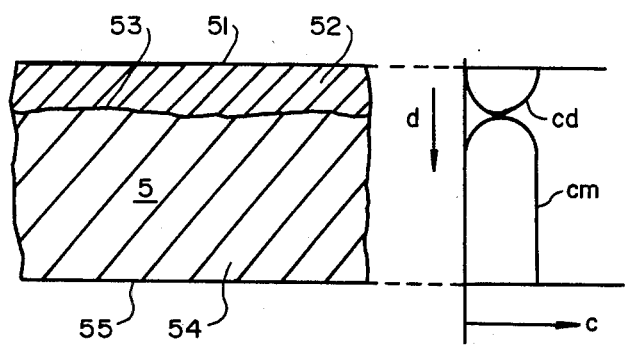

FIG. 2 a concentration graph.

The device illustrated in FIG. 1 is directly downstream of a known cutting device 1, in which the paving stones are saturated with water while being cut. If no cutting occurs, an immersion or spray device that the stone 5 can be left in long enough to be saturated with dispersant M will be adequate.

The saturated stone is advanced through a drying system 2 by a conveyor 6 to dry off "bottom" 51, which is the surface to be impregnated and which will latter be in contact with the mortar, as well as, preferably, the sides, to a predetermined depth. The temperature, air speed, and drying or through-pass time must be adjusted to the type of stone and to the desired drying depth in a known way. Forced drying by means of high-speed air with its temperature raised through a heat register H and at a briefer through-put is preferred in order to almost entirely prevent the dispersant from returning from inside and to establish satisfactory demarcation of areas 52 and 53. The surface 55 of the stone that is not to be dried rests on a covering base, conveyor 6 for instance.

Subsequent to drying, the surfaces that are to be impregnated are cleaned in a dust-removal device 21 by brushes and vacuum devices to completely clear the pores.

The dried surfaces are then saturated with dispersion D, which is kept in a reservoir 33, in which it is maintained by controls at a definite level and whence it is transferred in a way that is known from printing technology for example over absorbent distributor rollers 32 and 31 to an application roller 3 and thence to the surface of stone 5.

Appropriate application rollers, brushes, or even spray nozzles can be provided for the sides of the stone. The advantage of application rollers over spraying the dispersion from all sides is that fresh dispersion can constantly be applied, with the surface always accepting the amount appropriate to the particular previous drying process.

Since the impregnated surfaces are again force-dried in a another drying system 4 downstream, the dispersant will set in outermost area 52, tightly sealing off the pores and capillary channels and not descending undefined and irregularly into the deeper area 54.

In one practical further development of the method and device, the stone is subjected to a coarse vacuum or preferably to low pressure prior to and especially during application of the dispersion.

Coating device 3, 31, 32, and 33 is accordingly enclosed in a vacuum chamber 7 that a suction pump 71 always maintains a partial vacuum in. There are locks 72 and 73 at the entrance and exit between conveyor 6 and vacuum chamber 7. The locks can be elastic lip seals for example that match the cross-section of the stones and let them through as they advance.

FIG. 2 illustrates a stone saturated at its lower area 54 with dispersant M and at its upper area 52 with dispersion D. At the right of the picture is a graph cd, cm of concentration representing the situation that occurs subject to the more powerful vacuum when the air emerges from area 52 and capillary force, gravity and, as the air returns to the atmosphere, air pressure allow dispersion D to advance up to dispersant M.

The method can, as will be evident, also be employed for paving stones that are already in place, in which case, instead of the stones being conveyed through the wetting, drying, and vacuum impregnation devices, the devices or processing media—dispersant, drying air, vacuum, and dispersion—are conveyed over the stones.

The devices can in this case be separate or, preferably, combined into one component.

Furthermore, several impregnation processes or devices for the various surfaces can be carried out or positioned parallel or in series, with different dispersants being employed in each case.

FIG. 3 illustrates an impregnation device with a conveyor 6' that consists of powered rollers 61 sloping down toward the middle on each side of the path of conveyance. This device is employed for impregnating the bottom surface of the stones, and drying device 2 and 4 and application device 3 are accordingly located underneath. This system makes it possible to eliminated distributor rollers 31 and 32. The paving stones 5 are supported at their lower edges and advanced in the direction of travel by rollers 61.

I claim:

1. In a method of impregnating a plate (5) of a natural paving stone, with a dispersed cross-linked plastic material, in which a dispersion (D) of the material is applied to the surface (51) of the plate to be impregnated and the dispersant is substantially evaporated, the improvement wherein the plate (5) is extensively saturated with the pure dispersant (M) and subsequently only the surfaces (51: lateral surfaces) of the plate that are to be saturated are force dried at an air temperature and speed and for a duration sufficient for an area (52) of a predetermined depth corresponding to a small fraction of the thickness of the plate to dry, and the dispersion (D) is then applied or sprayed in a regulated flow, over the surfaces (51) to be impregnated, followed by forced drying of the impregnated surfaces (51).

2. The method as in claim 1, wherein the dispersion (D) is applied in a coarse vacuum or under low pressure.

3. The method as in claim 1 or 2, wherein the plate (5) is saturated with pure dispersant (M) while being cut and ground or trimmed and cleaned of dust between being dried and having the dispersion (D) applied to it.

4. The method as in claim, 1 or 2 wherein the dispersant (M) is water and the dispersion (D) contains at least one particle and droplets on a basis of acrylic resin with a mean diameter that is less than the mean pore width of the capillaries in the plate (d).

5. A device for impregnating a plate of absorbent material with a dispersed material, comprising: a conveyor (6) for moving plates (5) in a given direction, an application device for saturating the plates with a pure dispersant (M), an initial drying device (2) downstream of the application device and which consists of a blower with an air-flow regulator and a heat register (11) positioned in the stream of air and having an air-temperature regulator and which contains dry-air lines aimed at the surfaces (51) to be impregnated, a disperson-application device (3, 31, 32, and 33) downstream of the initial drying device that contains applicators that are associated with the surfaces to be impregnated (51) and that accept the disperson (D) through means (32 and 31) regulating flow, and release it to the surfaces (51) of the plates, and another drying device (4) downstream of the dispersion application device and that consists of a blower and dry-air lines aimed at the surfaces (51) saturated with dispersion (D), wherein the drying output of the another drying device (4) is at least equal to that of the initial drying device (2).

6. The device as in claim 5, wherein the dispersion-application device is enclosed in a vacuum chamber (7) connected to a coarse-vacuum or low-pressure suction device (71) and comprising locks (72 and 73), including elastic lip seals, at an entrance and exit for the conveyor (6) to and from the chamber.

7. The device as in claim 5 or 6, wherein different dispersion-application devices are associated with the different surfaces.

8. The device as in claim 5 or 6, wherein the application device comprises application rollers and the dispersion (D) is conveyed from a reservoir through a level regulator into a tub (33) and wherein the regulating means comprises a distributor roller (32) that is mounted such that it can rotate with its surface immersed and in contact with the surface of a transfer roller (31) that is mounted such that it can rotate and the surface of the transfer roller is in turn in contact with the surface of the application roller (3), and in that at least one of the rollers is synchronized with the conveyor (6).

9. The device as in claim 5, further comprising a dust-removal brush and a suction device positioned at or downstream of the initial drying device (2).

10. The device as in claim 5, wherein the conveyor (6) is a continuous horizontal conveyor belt that the plates (5) lie on with their total surface, and has a drive mechanism with a speed that can be continuously or discontinuously varied.

11. The device as in claim 5, wherein the conveyor (6') consists of powered rollers (61) sloping down toward the middle on each side of a path of conveyance and the drying and application devices (2, 3, and 4) are located underneath the conveyor (6').

* * * * *